United States Patent [19]

Tanaka

[11] Patent Number: 4,541,375

[45] Date of Patent: Sep. 17, 1985

[54] DIESEL ENGINE SWIRL CHAMBER HAVING IMPROVED MULTIPLE TRANSFER PASSAGE ARRANGEMENT

[75] Inventor: Toshiaki Tanaka, Chigasaki, Japan

[73] Assignee: Nissan Motor Co., Ltd., Japan

[21] Appl. No.: 428,227

[22] Filed: Sep. 29, 1982

[30] Foreign Application Priority Data

Oct. 15, 1981 [JP] Japan .................. 56-163498

[51] Int. Cl.⁴ .................................... F02B 19/10
[52] U.S. Cl. ................... 123/261; 123/286; 123/293
[58] Field of Search ............ 123/261, 263, 286, 289, 123/290, 291, 293, 262, 255, 253

[56] References Cited

U.S. PATENT DOCUMENTS

| | | | |
|---|---|---|---|
| 2,132,802 | 10/1938 | Fierue ............................ | 123/291 |
| 2,254,628 | 9/1941 | Simsich .......................... | 123/293 |
| 2,380,615 | 7/1945 | Sheppard ....................... | 123/291 |
| 2,853,060 | 9/1958 | Hockel ........................... | 123/293 |
| 2,979,044 | 4/1961 | Yamada .......................... | 123/32 |
| 4,116,191 | 9/1978 | Yanagihara et al. ............ | 123/293 |
| 4,122,805 | 10/1978 | Kingsbury et al. ............. | 123/286 |
| 4,129,100 | 12/1978 | Habu .............................. | 123/293 |
| 4,161,927 | 6/1979 | Yagi et al. ...................... | 123/261 |
| 4,186,692 | 2/1980 | Kawamura et al. ............ | 123/286 |
| 4,204,484 | 5/1980 | Miura ............................. | 123/293 |
| 4,270,449 | 6/1981 | Frelund ......................... | 123/261 |
| 4,323,039 | 4/1982 | Isugekawa et al. ............ | 123/286 |

FOREIGN PATENT DOCUMENTS

| | | | |
|---|---|---|---|
| 163554 | 12/1947 | Fed. Rep. of Germany ...... | 123/293 |
| 1119043 | 11/1959 | Fed. Rep. of Germany ...... | 123/293 |
| 1172472 | 2/1968 | Fed. Rep. of Germany ...... | 123/293 |
| 105509 | 9/1976 | Japan . | |
| 47405 | 4/1978 | Japan . | |
| 457969 | 8/1968 | Switzerland ..................... | 123/293 |
| 379605 | 9/1932 | United Kingdom . | |
| 1557449 | 12/1979 | United Kingdom . | |

OTHER PUBLICATIONS

Vortrag 1-02, Fisit A X11, 1968.

*Primary Examiner*—Raymond A. Nelli
*Attorney, Agent, or Firm*—Lowe, King, Price & Becker

[57] ABSTRACT

An auxiliary transfer passage is offset from the trajectory along which fuel is injected so as to be located downstream of the trajectory with respect to the direction of swirl within the swirl chamber and which is sized to have a cross-sectional area with respect to the main transfer passage and the cylinder bore in which the main combustion chamber is defined so as to simultaneously minimize smoke and $NO_x$ formation.

4 Claims, 8 Drawing Figures

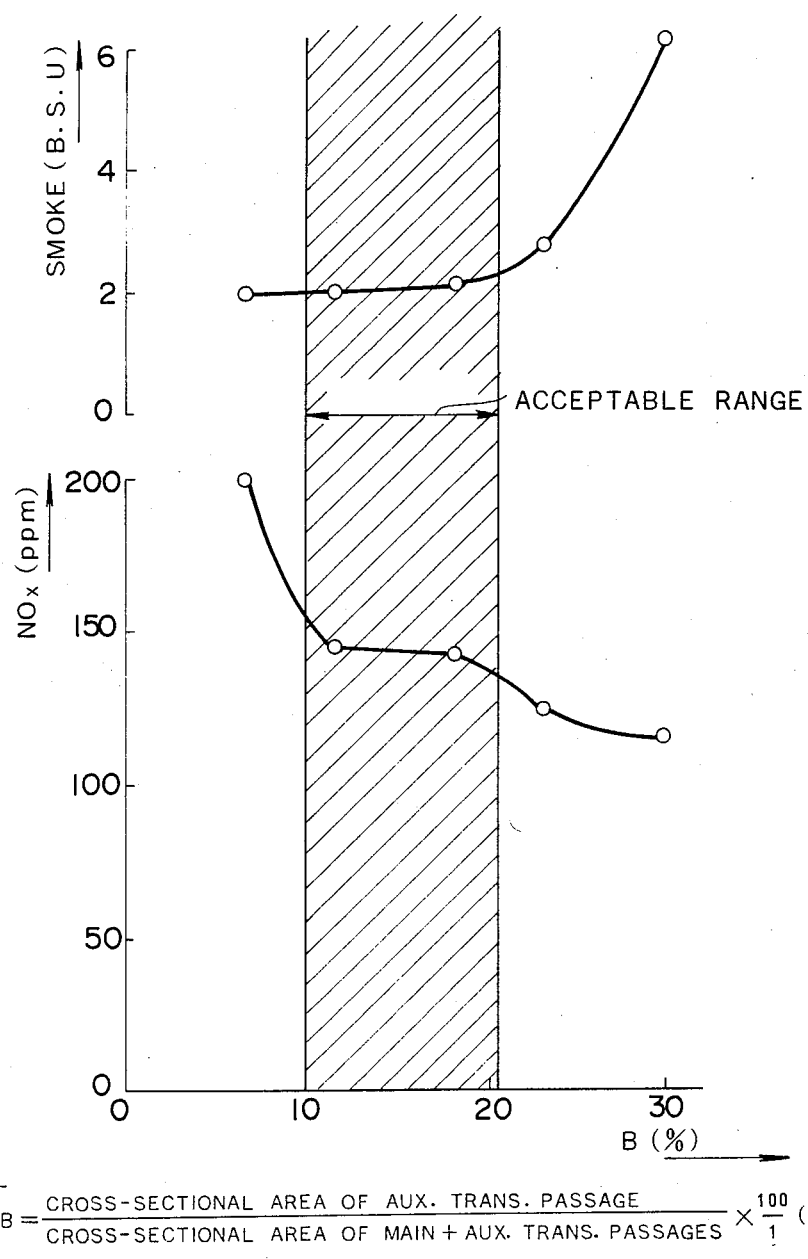

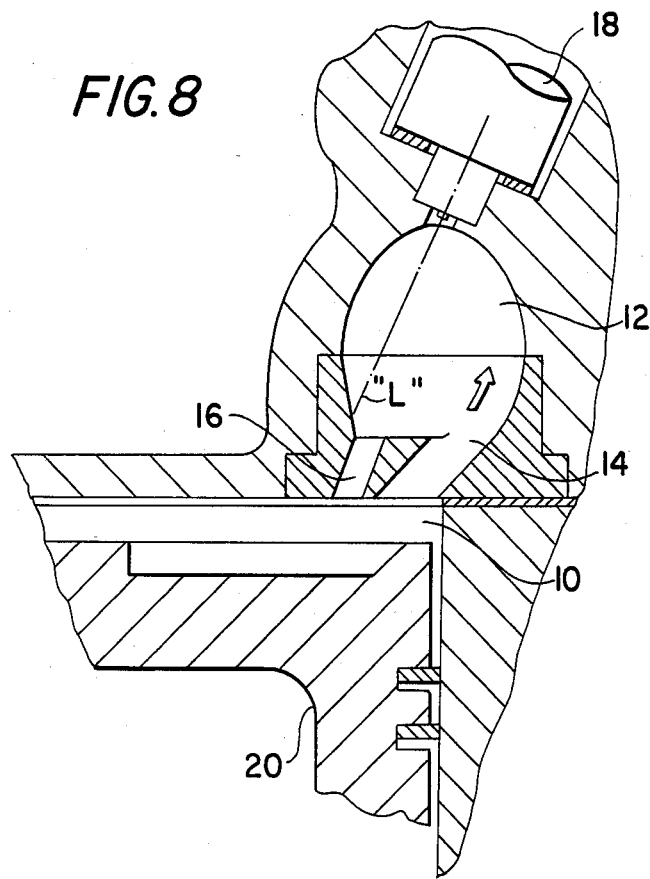

DIESEL ENGINE SWIRL CHAMBER HAVING IMPROVED MULTIPLE TRANSFER PASSAGE ARRANGEMENT

BACKGROUND OF THE INVENTION

1. Field of the Invention

The present invention relates generally to a diesel engine swirl chamber and more specifically to a swirl chamber which communicates with the main combustion chamber through an improved multiple transfer passage arrangement.

2. Description of the Prior Art

In previously proposed arrangements (such as disclosed in Japanese Utility Model Application Provisional Publication No. 53-47405 and Japanese Patent Application Provision Publication No. 51-105509) an auxiliary transfer passage or throat has been provided in addition to the main passage so as to allow some of the fuel injected into the swirl chamber to be transferred to the main combustion chamber for the purposes of reducing the peak combustion temperatures and thus suppressing the formation of $NO_x$. However, in a less preferred arrangement wherein the auxiliary throat or transfer passage 1 is, as shown in FIG. 1, disposed directly opposite the fuel injector nozzle 2 and in alignment with the imaginary center line or trajectory "L" along which the fuel is injected, a drawback is encountered in that the inertia of the fuel tends to cause some of the fuel to enter the main combustion chamber 3 in a liquid or non-atomized state wherein it is poorly mixed with air therein and subsequently exposed to a torch flame from the swirl chamber 4 having a relatively low oxygen content. This of course leads to incomplete combustion of the fuel in the main combustion chamber promoting smoke formation.

Further experiments have shown that if the cross-sectional area of the main transfer passage (which is usually larger than that of the auxiliary one) is reduced while maintaining the cross-sectional area of the auxiliary passage constant, the flame from the swirl chamber propagates into the main combustion chamber with an increased velocity and shortens the combustion time in the main combustion chamber. This promotes good combustion and reduces smoke emission enhances $NO_x$ formation. However, on the other hand if the cross-sectional area of the auxiliary passage is increased while that of the main transfer passage is maintained constant, a larger amount of fuel is permitted to reach the main combustion chamber increasing the combustion time and thus suppresses $NO_x$ formation but enhances smoke formation.

Hence, it has hitherto been very difficult to design a multiple transfer passage swirl chamber arrangement which will simultaneously permit the reduction of both smoke and $NO_x$ in view of the conflicting tendencies noted above.

SUMMARY OF THE INVENTION

It is an object of the present invention to provide a swirl chamber having a multiple transfer passage arrangement wherein the location and sizing of the main and auxiliary passages is such that both the formation of smoke and $NO_x$ are simultaneously suppressed.

The invention features an auxiliary transfer passage which is offset from the imaginary center line or trajectory along which fuel from the fuel injector travels (preferably in a direction downstream of the center line with respect to the direction of swirl within the swirl chamber) and which is sized so that the sum of the cross-sectional areas of the main and auxiliary transfer passages lies within a range of 0.8–1.0% of the cross-sectional area of the cylinder bore in which the main combustion chamber is defined and the cross-sectional area of the auxiliary transfer passage lies within a range of 10–20% of the sum of the cross-sectional areas of the main and the auxiliary transfer passages.

More specifically the present invention takes the form of a diesel engine including a main combustion chamber defined within a cylinder bore and a swirl chamber into which fuel is injected along a predetermined trajectory by a fuel injector, a main transfer passage leading from said swirl chamber to said main combustion chamber, said main transfer passage being adapted to direct a charge of air into said swirl chamber so as to swirl in a predetermined rotational direction therein, an auxiliary transfer passage leading from said swirl chamber to said main combustion chamber, and means for simultaneously suppressing the formation of $NO_x$ and smoke in said main combustion chamber and said swirl chamber, said means taking the form of said auxiliary transfer passage being offset with respect to said trajectory so that atomized fuel predominently passes therethrough, and said main and auxiliary transfer passages being sized so that the cross-sectional areas of said main and auxiliary transfer passages lies within a range of 0.8–1.0% of the cross-sectional area of said cylinder bore and the cross-sectional area of said auxiliary transfer passage lies within a range of 10–20% of the sum of the cross-sectional areas of the main and auxiliary transfer passages.

BRIEF DESCRIPTION OF THE DRAWINGS

The features and advantages of the arrangement of the present invention will become more clearly appreciated from the following description taken in conjunction with the accompanying drawings in which:

FIG. 7 is a graph similar to that of FIG. 6 but showing the terms of "B" the percentage B of the area of the auxiliary transfer passage to the sum of the cross-sectional areas of the main and auxiliary transfer passages, the resulting $NO_x$ and smoke formation when the sum of the cross-sectional areas of the main and auxiliary transfer passages to set at 0.9% with respect to the cross-sectional area of the cylinder bore, and the ratio "B" is varied; and FIG. 8 is a sectional view showing a third embodiment of the present invention.

DETAILED DESCRIPTION OF THE PREFERRED EMBODIMENTS

Figure 1:
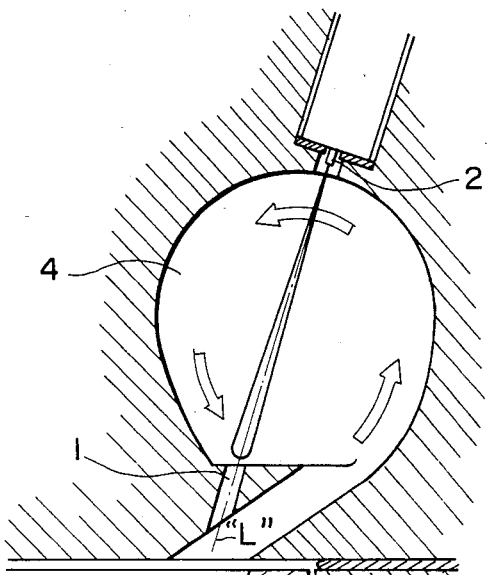
FIG. 1 is a sectional elevation of prior art arrangement briefly discussed in the opening paragraphs of the present disclosure.
Figure 2:
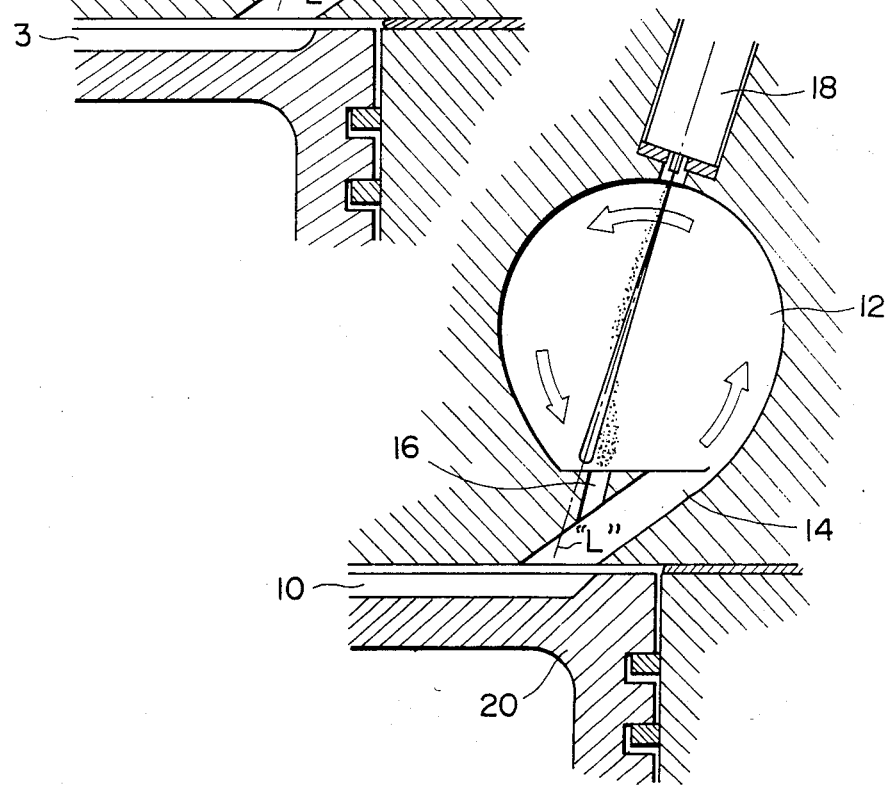
FIG. 2 is a sectional elevation showing a first embodiment of the present invention.

Turning now to FIG. 2 a first embodiment of the present invention is shown. In this arrangement a diesel engine having a compression ratio of (for example) 20-24:1 and a swirl chamber:total combustion chamber volume ration of 40-60%, is constructed such that the main combustion chamber 10 communicates with the swirl chamber 12 via a main transfer passage 14 and an auxiliary passage 16. A fuel injector 18 is adapted to inject fuel into the chamber along a trajectory or a path having a center line denoted by "L". With this arrangement as the piston 20 approaches and/or reaches TDC the charge in the main combustion chamber 10 is forced to pass through the main transfer passage 14 in a manner to establish a swirl (shown the by arrows) within the essentially spherical swirl chamber 12.

The auxiliary transfer passage 16 is formed so as to be offset with respect to trajectory "L" in the direction of the swirl, that is to say, located slightly downstream of the trajectory with respect to the direction of swirl. Thus, when fuel is injected into the swirl chamber the bulk of same follows the trajectory "L", under the influence of its own inertia however, a peripheral portion thereof which tends to atomize "en route", is subject to fluidic control by swirl and thus directed as shown, toward and into the auxiliary transfer 16 passage. The remainder of the injection tends to impinge on the shoulder portion of the swirl chamber just upstream of the auxiliary transfer passage 16 and subsequently be entrained by the swirl. With this arrangement, the fuel which enters the main combustion chamber through the auxiliary transfer passage tends to be highly atomized whereby, upon the charge in the swirl chamber igniting and a flame subsequently issuing into the main combustion chamber 10, the fuel therein is intimately mixed with air and thus able to effectively react with the oxygen therein and combust without smoke formation.

Figure 3:
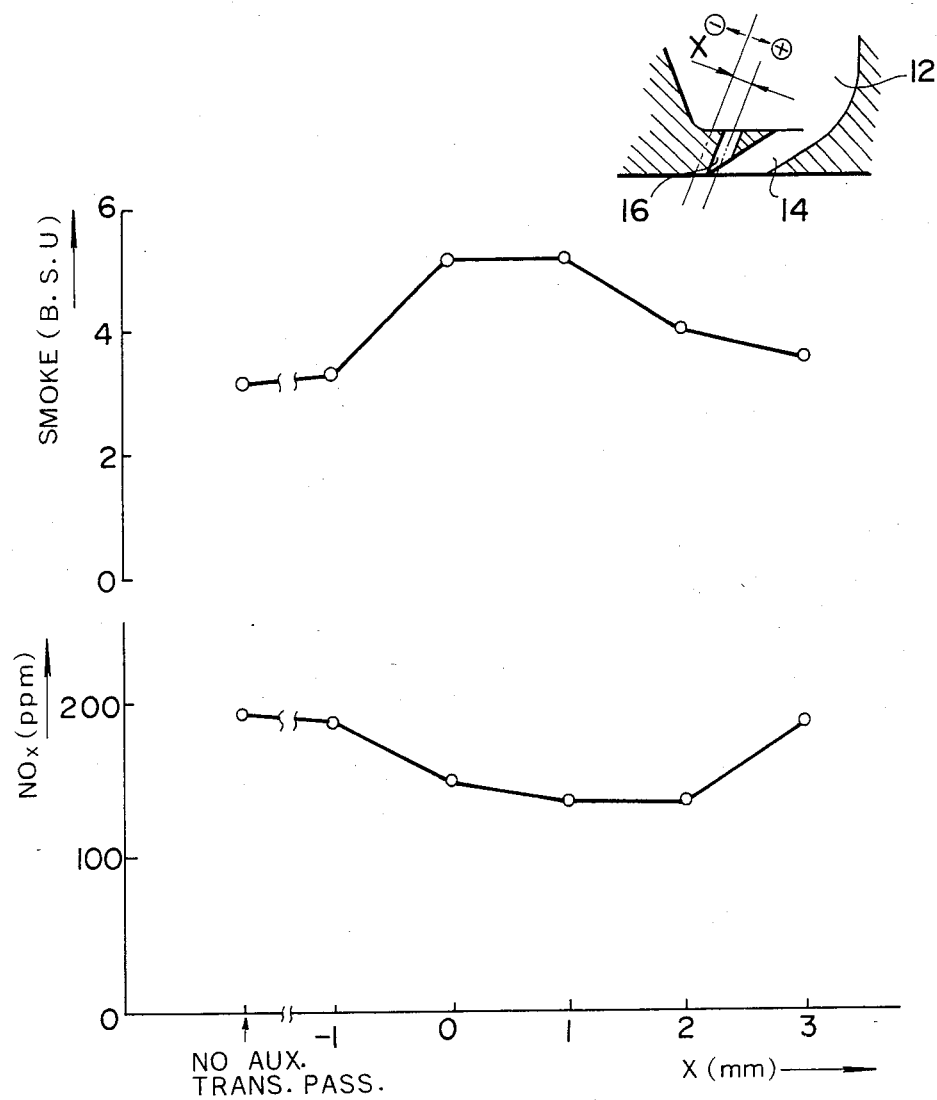
FIG. 3 is a graph showing in terms of displacement of the auxiliary passage from the imaginary line or trajectory followed by the injected fuel, the resulting $NO_x$ and smoke formation.

FIG. 3 shows in terms of displacement "X" (See insert at top right of this Figure) of the center of the auxiliary transfer passage from the trajectory "L", the results obtained with present invention. As will be apparent from the curves, by displacing the auxiliary transfer passage 16 approximately 1.5 to 2 mm from the trajectory "L", a notable reduction in both $NO_x$ and smoke formation can be simultaneously achieved.

To further reduce the formation of $NO_x$ and smoke the present invention requires that the dimensions of the auxiliary transfer passage 16 and the main transfer passage 14 be selected such that the sum of the cross-sectional areas thereof with respect to the cross-sectional area of the cylinder bore in which the main combustion chamber 10 is defined, falls within the range of 0.8-1.0% and that the cross-sectional area of the auxiliary transfer passage lie within the range of 10-20% of the sum of the cross-sectional areas of the main and auxiliary transfer passages.

Figure 6:
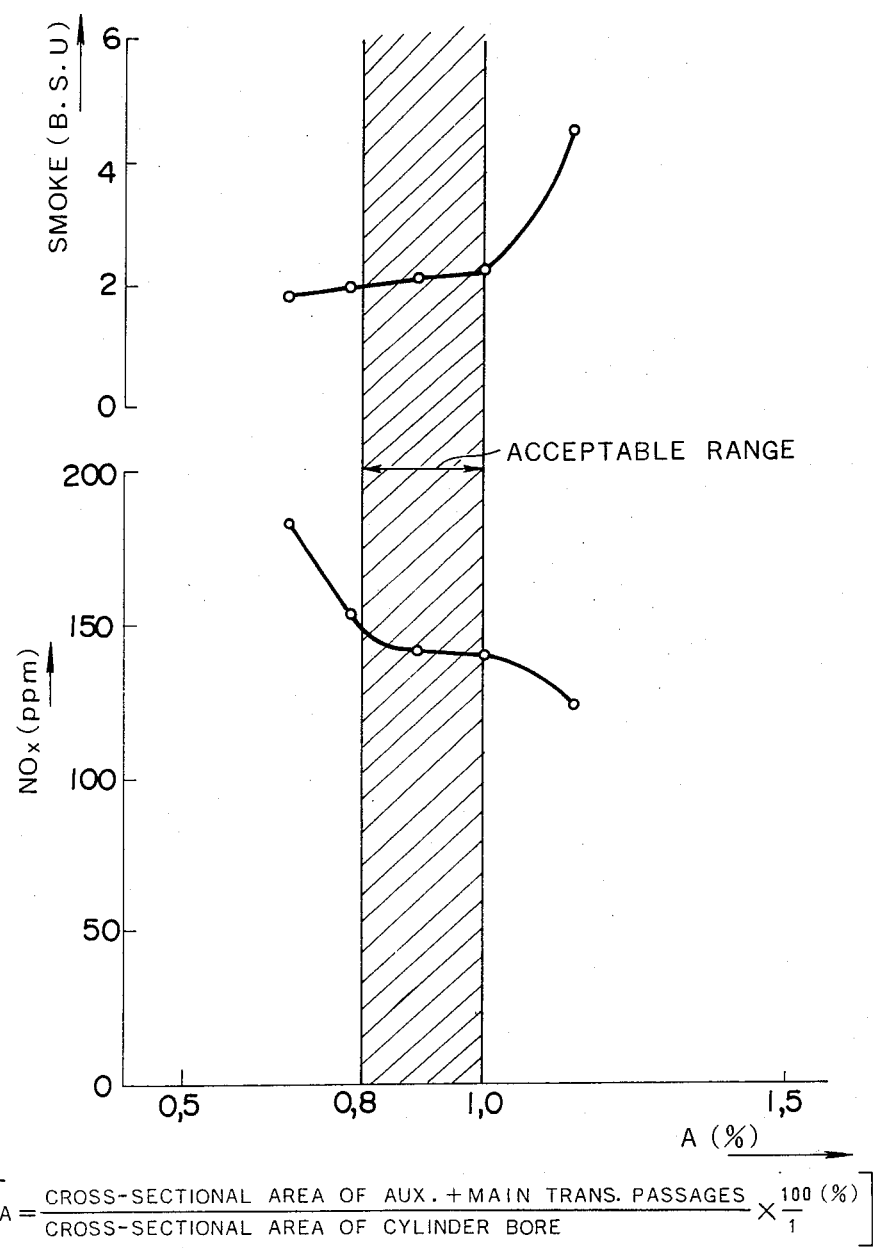
FIG. 6 is a graph showing in terms of "A" the percentage of the sum of the cross-sectional areas of the main and auxiliary transfer passages to the cross-sectional area of the cylinder bore, the formation of $NO_x$ and smoke when the cross-sectional areas of the main and auxiliary transfer passages are both varied and when the percentage of the area of the auxiliary transfer passage to the sum of the cross-sectional areas is held at 13%.

The reason for this is shown graphically in FIGS. 6 and 7. As shown, if A and B are selected to lie within the ranges of 0.8-1.0% and 10-20% respectively, then both of the $NO_x$ and smoke formation levels may be simultaneously maintained at relatively low levels.

Figure 4:
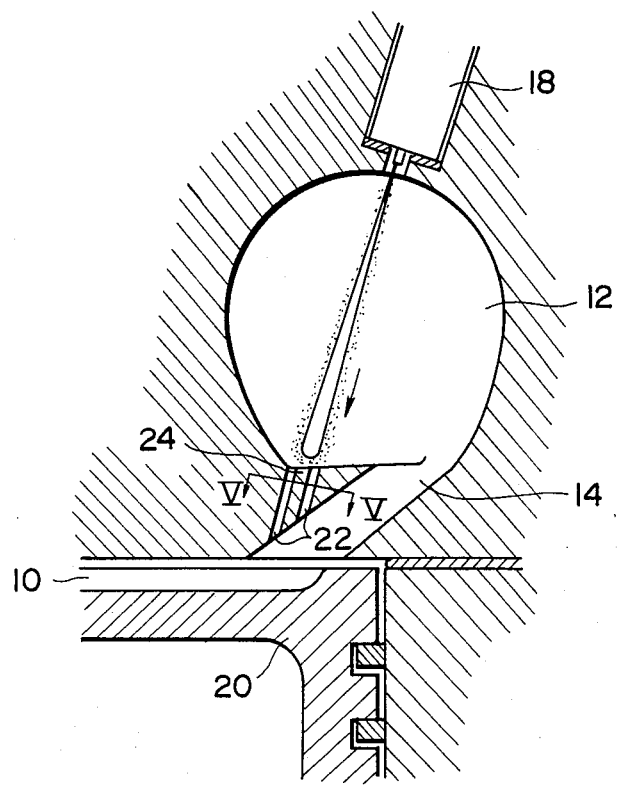
FIG. 4 is a sectional elevation of a second embodiment of the present invention.
Figure 5:
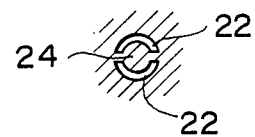
FIG. 5 is a section taken along section line V—V of FIG. 4.

FIG. 4 shows a second embodiment of the present invention wherein the auxiliary transfer passage takes the form of a pair of truncated ring shaped or annular passages 22 which run on either side of member 24. The jet of fuel is as shown, aimed at the pillar member 24. This arrangement is deemed meritorious in engines wherein the level of swirl within the swirl chamber is not very high. Viz., wherein the diameter of the main transfer passage is maximized (within the aforementioned limits) and the intensity of the swirl in the chamber limited and wherein the atomized fuel is apt to flow through both of the passages.

FIG. 8 shows a third embodiment of the present invention wherein auxiliary passage 16 extends from swivel chamber 12 to main combustion chamber 10.

What is claimed is:

1. In a diesel engine including a main combustion chamber established within an engine cylinder bore and a swirl chamber into which fuel is injected along a predetermined trajectory by a fuel injector;

a main transfer passage leading from said swirl chamber into said main combustion chamber, said main transfer passage being adapted to direct a change of air into said swirl chamber so as to swirl in a predetermined rotational direction therein; and an auxiliary transfer passage having an inlet port leading from said swirl chamber towards said main combustion chamber, said auxiliary transfer passage being offset with respect to said trajectory in the direction of the swirl and thus located downstream of said trajectory with respect to the direction of swirl, whereby only well atomized fuel which is swept away from said trajectory by said swirl tends to pass through said auxiliary transfer port and enter said main combustion chamber, wherein the cross-sectional area of said auxiliary transfer passage lies within a range of 10-20% of the sum of the cross-sectional areas of the main and auxiliary transfer passages.

2. In a diesel engine including a main combustion chamber defined within a cylinder bore and a swirl chamber into which fuel is injected along a predetermined trajectory by a fuel injector;

a main transfer passage leading from said swirl chamber to said main combustion chamber, said main transfer passage being adapted to direct a charge of air into said swirl chamber so as to swirl in a predetermined rotational direction therein; and means for transferring a portion of the fuel injected into said swirl chamber into said main combustion chamber in an atomized state, said means including an auxiliary transfer passage leading from said swirl chamber toward said main combustion chamber, said auxiliary transfer passage being offset with respect to said trajectory in the direction of the swirl and thus located downstream of said trajectory with respect to the direction of swirl whereby only well atomized fuel which is swept away from said trajectory by said swirl tends to pass through said auxiliary transfer port and enter said main combustion chamber.

3. The diesel engine of claim 1, wherein said auxiliary transfer passage extends from said swirl chamber to said main combustion chamber.

4. In a diesel engine including a main combustion chamber established within an engine cylinder bore and a swirl chamber into which fuel is injected along a predetermined trajectory by a fuel injector;

a main transfer passage leading from said swirl chamber to said main combustion chamber, said main transfer passage being adapted to direct a charge of air into said swirl chamber so as to swirl in a predetermined rotational direction therein; and an auxiliary transfer passage having an inlet port leading from said swirl chamber towards said main combustion chamber, said auxiliary transfer passage being offset with respect to said trajectory in the direction of the swirl and thus located downstream of said trajectory with respect to the direction of swirl, whereby only well atomized fuel which is swept away from said trajectory by said swirl tends to pass through said auxiliary transfer port and enter said main combustion chamber, wherein said auxiliary transfer passage has a truncated ring shape in cross section and further comprises a second truncated ring shaped passage in cross section located upstream of the first said truncated ring shaped passage, the first said truncated ring shaped passage and said second truncated ring shaped passage defining a column-like member therebetween, said trajectory terminating in approximately the center of said column-like member.

* * * * *